INVENTOR
Carlo Caminati
BY Duell and Kann
ATTORNEYS

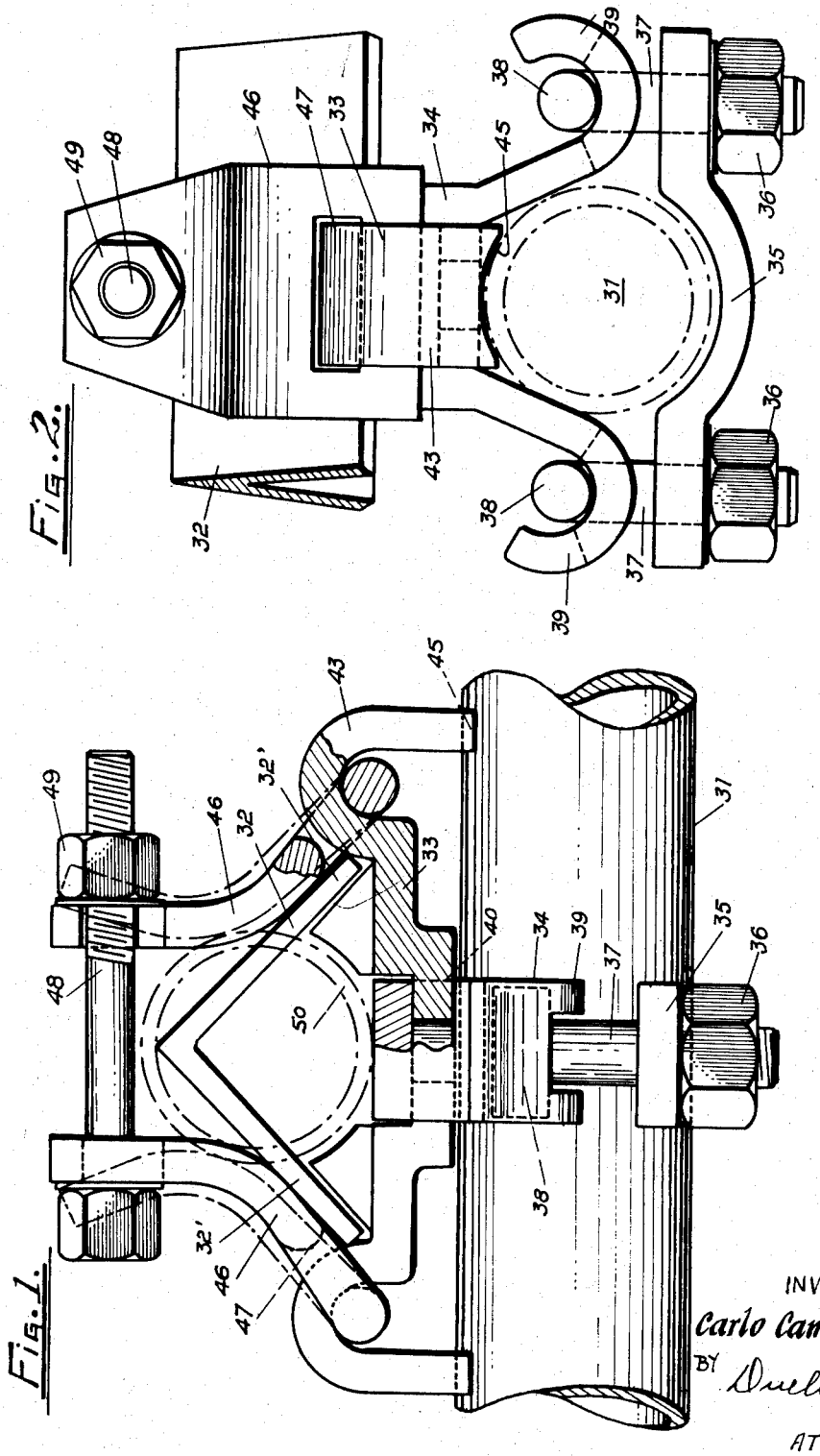

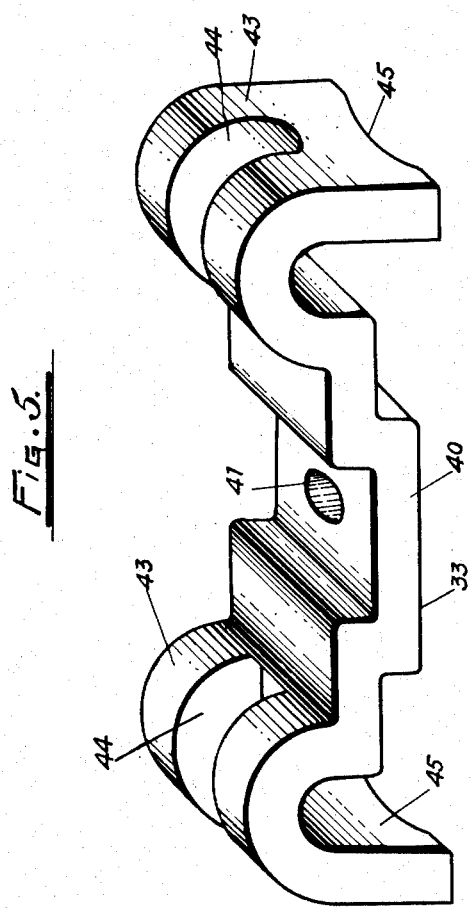

Patented Oct. 13, 1953

2,655,394

UNITED STATES PATENT OFFICE 2,655,394

CONNECTION FOR SCAFFOLDINGS, SHELVES, RACKS, AND LIKE STRUCTURES

Carlo Caminati, Paris, France, assignor to Tubcor International, Paris, France, a corporation of France Application January 21, 1950, Serial No. 139,826
In France January 26, 1949

4 Claims. (Cl. 287—54)

1

The present invention relates to the connections usually used for assembling the tubular elements or the elements formed by section bars, angle bars, and the like, of collapsible metal structures such as scaffoldings, shelves, racks, and like structures and, in a more particular manner, to a connection which is simple and quick to manufacture and which, although comparatively light, has very varied possibilities of use even in the case in which the assembly has to have fairly exacting properties as regards resistance to slipping.

Most of the connections heretofore used for assembling two tubes or scaffolding elements comprise a core on which are provided seats for accommodating the metal elements of said scaffolding, and with which are combined members for tightening and locking said elements so as to prevent any slipping. These various elements of the connection are comparatively massive and heavy in order to provide the necessary strength for the tightening and enable an efficient locking to be obtained. The quantity of material used for their manufacture naturally involves a relatively high cost of manufacture, the effect of which on the cost of the metal structure itself is not negligible owing to the number of connections usually used.

On the other hand, scaffolding clamps are known consisting of two U-shaped clips linked together by their central portion and in the parallel limbs of which are inserted the scaffolding members to be clamped, bolts or wedging members being provided at the ends of these limbs for clamping the said scaffolding members between the central portions of the U-shaped clips and their two limbs.

The objects of the present invention are to provide a connection which can be used for the selective assembling of tubular elements and section bars or angle bars, or of section bars and/or angle bars to one another, said connection being very robust in design and capable of withstanding considerable stresses, and the elements of the construction being rigidly clamped in a particularly effective manner.

According to the invention, the connection comprises two stirrups having their medial portions placed over one another in a removable manner and having their free ends provided with

2 means for clamping elements of a structure against said stirrups, and is characterized by the fact that at least one of the stirrups comprises a median portion adapted to accommodate elements of the structure of various sections, such as angle irons and tubular elements, and wing portions bent back at their ends to provide arcuate hinging means for the ends of two symmetrically arranged clamping means adapted to clamp the elements of the structure against the said stirrups.

The ensuing description, made with reference to the accompanying drawings, which are given merely by way of examples, will enable the invention to be understood more clearly.

In these drawings:

Fig. 1 is a front view, partly in section, of another embodiment of the connection according to the invention.

Fig. 2 is a corresponding end view thereof.

Fig. 5 is a perspective view of a stirrup adapted to be used with the shape of connection according to Figs. 1 to 4.

Figure 3:
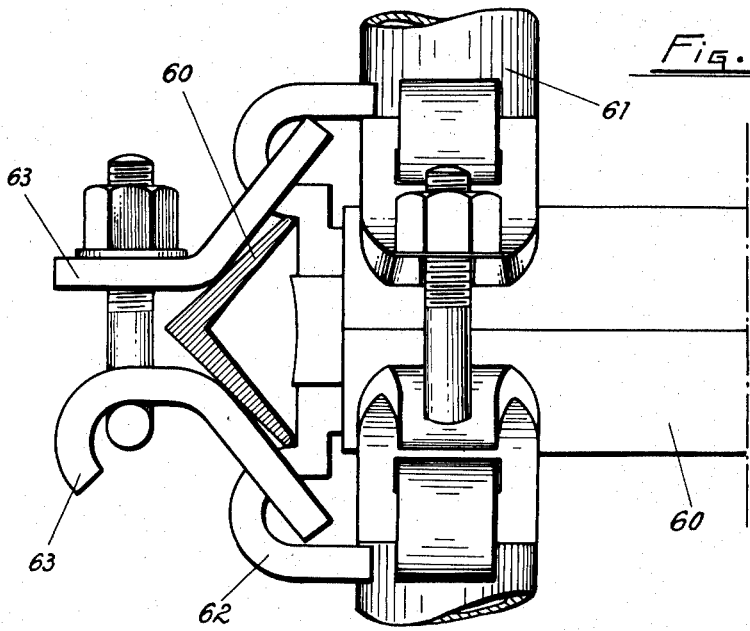
Fig. 3 is an elevational view of an assembly of two angle bar stays to a tubular upright.

The connection according to the invention is formed by the assembly of two stirrups, at least one of which being in the form shown in Fig. 5 of the drawings. These stirrups are generally designated in Figs. 1 to 3 and 5 by the reference numeral 33 and when one of the associated stirrups is not of the type shown in Fig. 5, it may be of any suitable type such as indicated at 34 (Figs. 1 and 2) provided its medial part is adapted to come into contact with the medial part 40 of the stirrup 33.

Referring now to the embodiment of the invention shown in Figs. 1 to 5, the connection is used, in the case in question, for assembling a tubular element 31 and an angle bar 32 which intersect at right angles. This connection is formed by two stirrups 33 and 34 engaged by their medial portion. The tube 31 is clamped in the stirrup 34 by means of a strap 35, which is pressed against said tube by tightening the two nuts 36 on the bolts 37, the heads 38 of which are adapted to pivot so as to form hinges in the curved wings 39 of the stirrup. The tube 31 thus bears against the medial portion 40 of the stirrup 33 and secures it to the stirrup 34.

In the example illustrated, use is made of a stamped stirrup for example, of the type shown in Fig. 5. The medial portion 40 of this stirrup forms a housing for accommodating the medial arm of the associated stirrup 34, and in this case is provided with an opening 41, for example for passing an assembling pin for the stirrups or for a similar purpose. The wings 43 of the stirrup 33 are curved as shown in the drawing and are provided with openings 44 or a bolt stem to pass for example, the head of which may form a pivot and is retained in the groove formed on the lower face of the wings 43. The free ends of said wings are located substantially in the same plane as the lower face of the medial portion 40 and are provided with arcuate edge portions 45, the function of which will be explained hereinafter. If desired, said opening 44 could moreover be eliminated as in the embodiment of Fig. 1.

These stirrups can be manufactured by pressing or, if desired, be cast or be obtained by any suitable means, it being possible, if necessary, for the two associated stirrups to be cast together so as to form a one-piece core.

In the embodiment of Figs. 1 and 2, two lateral straps 46 are engaged by openings 47 on the wings 43 of the stirrup 33. The curved edges of the openings 47 enable a pivotal coupling to be obtained that acts like a hinge, while providing a strong and simple structure. Said straps are outwardly curved and are bored near their free ends to allow a bolt 48 to pass, on which a clamping nut 49 is mounted. The angle bar 32 to be held in the stirrup 33 may be arranged as shown, with the wings 32' directed towards the medial portions of the connection. When the nut 49 is tightened, the locking straps 46 press tightly as shown, against the outer face of said wings 32' and press the angle bar 32 against the medial portion of the stirrup. The clamping force is greater as the method of locking thus obtained acts by means of an active lever arm which, in the example considered, is substantially in a ratio of 3:1 from the pivot. The locking is therefore extremely effective. On the other hand, the straps 46 act by deformation so as to produce an intense resilient clamping, and the lateral hinges obtained prevent the system being subjected to a prestressing which would be incapable of withstanding the overload, which is sometimes considerable, due to the vibrations of the structure as hereinbefore mentioned. The assembling of the stirrups is such that the system forms a very compact unit, the distance between the elements 31, 32 of the structure being comparatively short. The pressure of the straps 46 against the wings 32' of the angle bar 32 furthermore produces a self-binding effect on same.

In Fig. 1, the method of assembling two tubular elements by means of the connection in question is shown in dot-and-dash lines. The lateral straps 46 are in this case moved apart from one another to enable the tube 50 to be placed in position and, by suitably calculating the length of the straps 46 and the diameter of the tube 50, an efficient clamping is obtained at three peripheral points spaced 120° apart, thereby exerting a clamping stress on the tube and preventing any slipping. It would moreover also be possible to clamp an angle bar or a section bar arranged otherwise.

It will consequently be observed that this tightening of the elements of the structure enables an efficient locking to be obtained.

Figure 4:
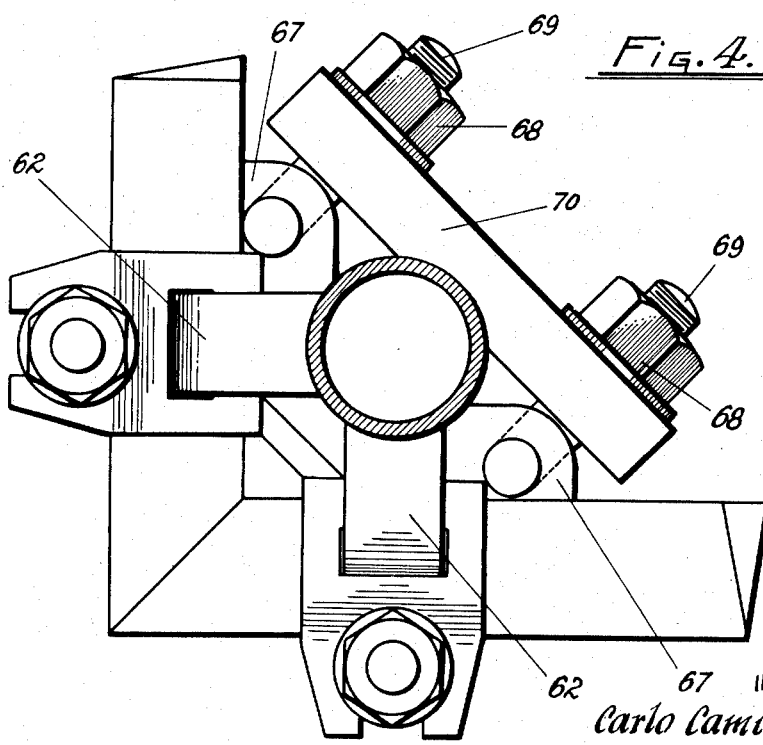
Fig. 4 is a corresponding plan view thereof.

In Figs. 3 and 4 the connection according to the invention is shown applied to the assembling of two angle bar cross members 60 to a tubular upright 61. In this embodiment of the invention, two stirrups 62, 62 of the type shown in Fig. 5 are again used, said stirrups being adapted to co-operate with lateral straps 63, 64 which are tightened by means of bolts 65, 65 and nuts 66, 66. The stirrups 62, 62 are furthermore adapted to co-operate with stirrups 67, 67 by means of which the tubular upright 61 is clamped by a strap 70 which is tightened by means of two nuts 68, 68 that screw on the bolts 69, 69.

Fig. 5 is a perspective view of a preferred embodiment of the stirrup for use in the connection according to the invention. It will be noted that its free ends are located substantially in the plane of the lower face of the medial portion so as to enable them to press against the element of the structure which is clamped in the associated stirrup. In Fig. 5, the free ends are arcuate in shape, as shown at 15 so that they shall fit a tubular member on which the stirrup is to be clamped. It is understood however that the free ends 43 could be extended below the level of the medial portion 40 so as to come into contact with and fit the inner face of an element of the construction of a shape other than tubular, such as a section bar, e. g. a U or V-shaped bar.

Thus, among others, the several objects of the invention as specifically aforenoted are achieved. Obviously numerous changes in construction and rearrangement of the parts might be resorted to without departing from the spirit of the invention as defined by the claims.

I claim:

1. A connection for scaffoldings, shelves, racks and like collapsible structures, comprising two stirrups that are removably engaged with one another by their medial portion and associated with clamping means, one at least of said stirrups exhibiting a wide-based central portion capable of accommodating elements of the structure of various sections and having bent back wing portions whose free ends bear against one of the elements of the structure, said stirrup being associated with clamping straps each of which is hinged at one end to an arcuate portion of one of said wings and being tightened at the other end against another element of the structure and against the other strap by a bolt and nut device, the said straps bearing against the said other element at a point intermediate the length of said straps.

2. A connection according to claim 1, in which the said straps are of arcuate shape and their convex side bears against the element of the structure to be clamped at a point intermediate the length of said straps.

3. A connection for scaffoldings, shelves, racks and like collapsible structures, comprising, in combination, two stirrups that are removably engaged with one another by their medial portion, and associated with clamping means, one at least of said stirrups exhibiting a wide based central portion longitudinally of the stirrup, adapted to accommodate elements of the structure of various sections, said stirrup having bent back wing portions whose free ends lie substantially in the plane of the under face of the central portion of the stirrup and bear against one of the elements of the structure, said stirrup being associated with clamping straps each of which is hinged at one end to an arcuate portion of one of the said wings and being tightened at the other end on to an element of the structure and against the other strap by a bolt and nut device, the said straps bearing against the element to be clamped at a point intermediate the length of said straps.

4. A connection according to claim 1 wherein the free ends of the wing portions of the stirrups are arcuate in shape to fit the tubular element of the structure on which it bears.

CARLO CAMINATI.

References Cited in the file of this patent

UNITED STATES PATENTS

| Number | Name | Date |
|---|---|---|
| 2,133,197 | Innocenti | Oct. 11, 1938 |
| 2,280,509 | Cheron | Apr. 21, 1942 |
| 2,389,751 | Artique | Nov. 27, 1945 |
| 2,494,826 | Mulder | Jan. 17, 1950 |

FOREIGN PATENTS

| Number | Country | Date |
|---|---|---|
| 340,337 | Italy | of 1936 |
| 855,172 | France | of 1940 |
| 947,229 | France | of 1949 |